(12) United States Patent
Murakami et al.

(10) Patent No.: US 11,804,881 B2
(45) Date of Patent: Oct. 31, 2023

(54) RADIO BASE STATION AND RECEPTION METHOD AT RADIO BASE STATION

(71) Applicant: NIPPON TELEGRAPH AND TELEPHONE CORPORATION, Tokyo (JP)

(72) Inventors: Tomoki Murakami, Musashino (JP); Toshiro Nakahira, Musashino (JP); Riku Omiya, Musashino (JP); Koichi Ishihara, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/278,693

(22) PCT Filed: Oct. 18, 2019

(86) PCT No.: PCT/JP2019/041195
§ 371 (c)(1),
(2) Date: Mar. 23, 2021

(87) PCT Pub. No.: WO2020/085255
PCT Pub. Date: Apr. 30, 2020

(65) Prior Publication Data
US 2022/0038141 A1    Feb. 3, 2022

(30) Foreign Application Priority Data

Oct. 25, 2018   (JP) .................................. 2018-201282

(51) Int. Cl.
*H01Q 3/04*    (2006.01)
*H04B 7/08*    (2006.01)
(Continued)

(52) U.S. Cl.
CPC ............. *H04B 7/043* (2013.01); *H01Q 1/246* (2013.01); *H01Q 3/04* (2013.01); *H01Q 3/24* (2013.01);
(Continued)

(58) Field of Classification Search
CPC .. H04B 7/0802; H04B 7/0805; H04B 7/0822; H04B 7/0837; H04B 7/0868;
(Continued)

(56) References Cited

U.S. PATENT DOCUMENTS 7,860,182 B2 * 12/2010 Gorsuch ............... H04B 7/0805
                                                      375/267
7,940,871 B2 *  5/2011 Rooyen ................ H04B 7/0848
                                                      455/132

(Continued)

FOREIGN PATENT DOCUMENTS

| JP | 2009081578 A | 4/2009 |
| JP | 2013533681 A | 8/2013 |

OTHER PUBLICATIONS

IEEE Std 802. 11ac-2013, Dec. 2013.
(Continued)

*Primary Examiner* — Betsy Deppe
(74) *Attorney, Agent, or Firm* — Harness, Dickey & Pierce, P.L.C.

(57) ABSTRACT

A characteristic variable antenna configured to be able to select or switch antenna characteristics in accordance with a predetermined periodic variable timing, an RF unit configured to perform a reception process on a signal received by the characteristic variable antenna, an ADC unit configured to sample the analog signal input from the RF unit at a sampling period corresponding to the variable timing of the antenna characteristics of the characteristic variable antenna, a signal dividing unit configured to divide the digital signal (Continued)

input from the ADC unit into different digital signals in accordance with the antenna characteristics and output the divided different digital signals, a MIMO-OFDM demodulation unit configured to receive inputs of the different digital signals divided by the signal dividing unit and perform a demodulation process of predetermined MIMO-OFDM, and a control unit configured to periodically select or switch the antenna characteristics of the characteristic variable antenna in accordance with the sampling period of the ADC unit are included.

3 Claims, 5 Drawing Sheets

(51) Int. Cl.
     *H04L 27/26*      (2006.01)
     *H04B 7/0413*      (2017.01)
     *H04B 7/0426*      (2017.01)
     *H01Q 1/24*      (2006.01)
     *H01Q 3/24*      (2006.01)

(52) U.S. Cl.
     CPC ......... *H04B 7/0413* (2013.01); *H04B 7/0805* (2013.01); *H04B 7/0837* (2013.01); *H04L 27/2647* (2013.01)

(58) Field of Classification Search
     CPC .... H04B 7/0874; H04B 7/0413; H01Q 1/246; H01Q 3/04; H04L 27/2647
     See application file for complete search history.

(56) References Cited

U.S. PATENT DOCUMENTS

| | | | |
|---|---|---|---|
| 8,488,702 B2* | 7/2013 | Hasegawa | H04B 7/0684 375/267 |
| 8,681,890 B2* | 3/2014 | Petrovic | H04B 7/0822 375/348 |
| 10,171,152 B2* | 1/2019 | Oh | H04B 7/0413 |
| 2009/0080579 A1 | 3/2009 | Fujii | |
| 2011/0299630 A1 | 12/2011 | Petrovic | |

OTHER PUBLICATIONS

"International Search Report (PCT/ISA/210)" with its partial English translation, "Notification of Transmittal of the International Search Report and the Written Opinion of the International Searching Authority, or the Declaration (PCT/ISA/220)" and "Written Opinion of the International Searching Authority (PCT/ISA/237)" dated Dec. 10, 2019, in PCT/JP2019/041195, filed on Oct. 18, 2019.

* cited by examiner

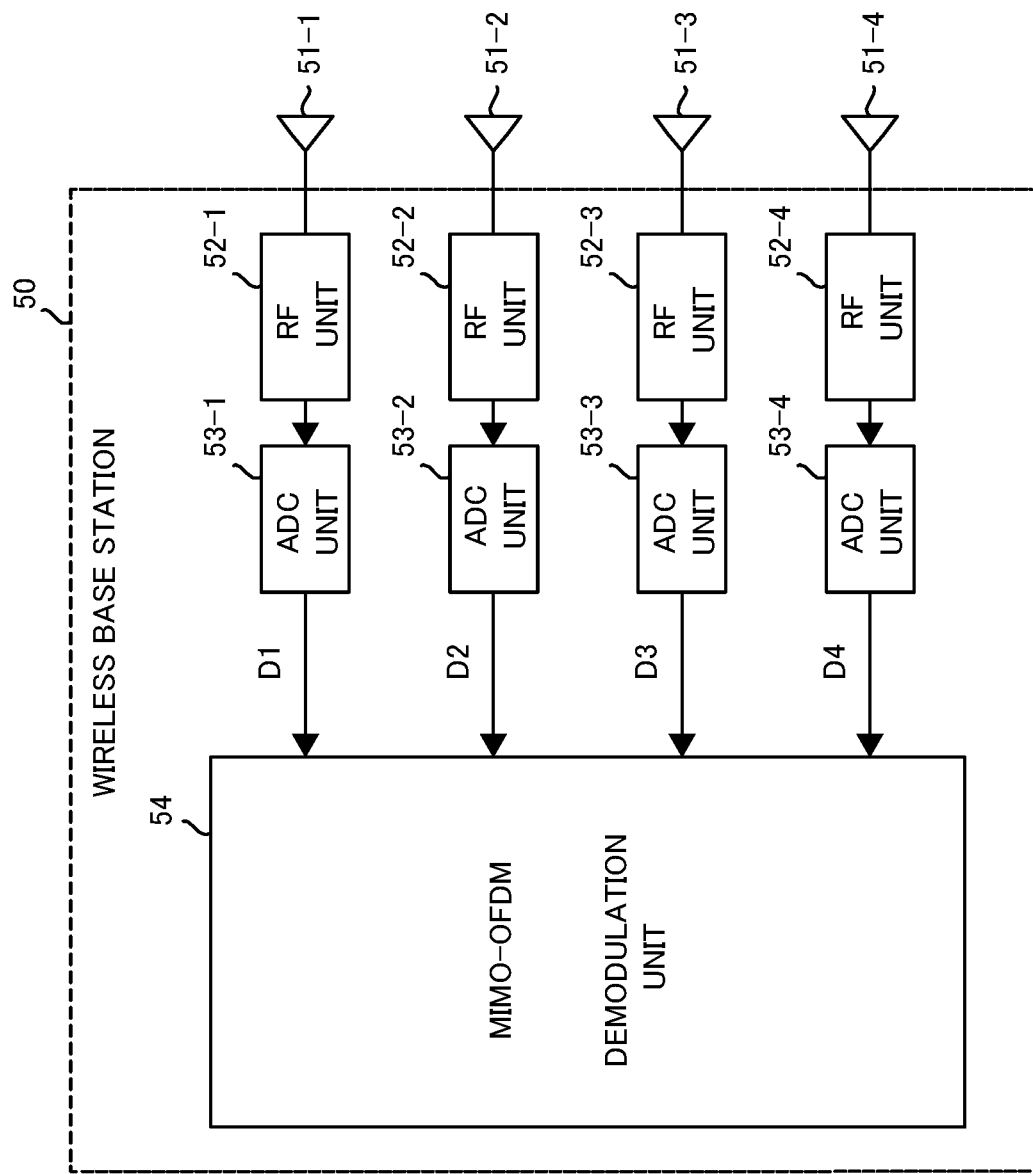

ial Application No. PCT/JP2019/041195, filed on Oct. 18, 2019, which claims priority to Japanese Application No. 2018-201282, filed on Oct. 25, 2018. The entire disclosures of the above applications are incorporated herein by reference.

RADIO BASE STATION AND RECEPTION METHOD AT RADIO BASE STATION

CROSS-REFERENCE TO RELATED APPLICATIONS

This application is a 371 U.S. National Phase of International Application No. PCT/JP2019/041195, filed on Oct. 18, 2019, which claims priority to Japanese Application No. 2018-201282, filed on Oct. 25, 2018. The entire disclosures of the above applications are incorporated herein by reference.

TECHNICAL FIELD

The present invention relates to a radio base station and a reception method at radio base station that configure an RF unit and an ADC unit to be shared by a plurality of antennas in the radio base station that receives MIMO-OFDM signals transmitted from a plurality of wireless terminal stations.

BACKGROUND ART

As high-speed wireless access systems using 5 GHz-band radio waves, there are wireless LANs based on an IEEE 802.11a standard, an IEEE 802.11n standard, and an IEEE 802.11ac standard (hereinafter, respectively referred to as the 11a standard, the 11n standard, and the 11ac standard). In the 11a standard, a maximum transmission speed of 54 Mbit/s has been achieved by stabilizing characteristics in a multi-path fading environment based on an orthogonal frequency division multiplexing (OFDM) modulation system. In addition, in the 11n standard, a maximum transmission speed of 600 Mbit/s has been achieved by using Multiple Input Multiple Output (MIMO) in which space division multiplexing is performed using a plurality of antennas in the same radio channel and by using a channel bonding technology using a 40 MHz frequency channel simultaneously using two 20 MHz frequency channels.

Furthermore, in the 11ac standard (Non Patent Literature 1), radio communication having a higher speed and a higher efficiency than the 11n standard has been achieved by using a channel bonding technology of using a maximum 160 MHz frequency channel by simultaneously using up to eight 20 MHz frequency channels, a downlink multiuser MIMO technology of simultaneously transmitting different signals to a plurality of destinations in the same radio channel, or the like.

At present, establishment of an IEEE 802.11ax standard (hereinafter referred to as the 11ax standard) focusing on not only improvement of a transmission speed but also improvement of a transmission efficiency is also being formulated. In the flax standard, promotion of spatial frequency reuse by simultaneous transmission, efficiency enhancement of the OFDM modulation system, and uplink/downlink OFDMA transmission and uplink multiuser MIMO transmission as multiuser transmission are planned to be added.

CITATION LIST

Non Patent Literature

Non Patent Literature 1: IEEE Std 802.11ac-2013, December 2013.

SUMMARY OF THE INVENTION

Technical Problem

FIG. 5 illustrates a configuration example of a radio base station according to the related art.

In FIG. 5, the radio base station 50 includes a plurality of (here, four) antennas 51-1 to 51-4, a plurality of RF units 52-1 to 52-4, a plurality of ADC units 53-1 to 53-4, and a MIMO-OFDM demodulation unit 54. Functional blocks that are generally mounted on a radio base station are omitted.

MIMO-OFDM signals received by the antennas 51-1 to 51-4 are respectively input to the RF units 52-1 to 52-4. The RF units 52-1 to 52-4 perform analog processing such as amplification, frequency changing, filtering and the like on the MIMO-OFDM signals respectively input from the antennas 51-1 to 51-4, and the RF units 52-1 to 52-4 respectively output converted signals to the ADC units 53-1 to 53-4. Here, a function of an RF front end of a general radio device is assumed to be mounted in each of the RF units. The ADC units 53-1 to 53-4 convert analog signals, which are respectively input from the RF units 52-1 to 52-4 and correspond to the characteristics of the antennas, into digital signals and output the digital signals to the MIMO-OFDM demodulation unit 54 in parallel. The MIMO-OFDM demodulation unit 54 performs demodulation processing of the MIMO-OFDM defined in a wireless LAN system or the like on digital signals D1 to D4 that are input in parallel in accordance with the characteristics of the antennas.

In this way, in radio base stations according to the related art, in order to perform MIMO-OFDM demodulation on received signals, RF units and ADC units corresponding to the number of antennas need to be installed. Furthermore, in wireless communication systems of 5G and the like in recent years, the number of antennas has dramatically increased as in massive MIMO transmission, and thus there is a demand to solve problems in which costs and power consumption increase as the number of RF units and ADC units increases.

An object of the present invention is to provide a radio base station and a reception method at radio base station capable of configuring an RF unit and an ADC unit to be shared in a radio base station receiving MIMO-OFDM signals transmitted from a plurality of wireless terminal stations by periodically switching antenna characteristics in synchronization with a reception sampling period.

Means for Solving the Problem

According to a first invention, a radio base station that receives an uplink multi-user MIMO signal according to OFDM modulation includes a characteristic variable antenna configured to be able to select or switch antenna characteristics in accordance with a predetermined periodic variable timing, an RF unit configured to perform a reception process on a signal received by the characteristic variable antenna and output an analog signal on which the reception process has been performed, an ADC unit configured to convert the analog signal input from the RF unit into a digital signal by sampling the analog signal at a sampling period corresponding to the variable timing of the antenna characteristics of the characteristic variable antenna and output the digital signal, a signal dividing unit configured to divide the digital signal input from the ADC unit into different digital signals in accordance with the antenna characteristics and output the divided different digital signals, a MIMO-OFDM demodulation unit configured to receive inputs of the different digital signals divided by the signal dividing unit and perform a demodulation process of predetermined MIMO-OFDM, and a control unit configured to give the predetermined variable timing at which the antenna characteristics of the characteristic variable antenna are periodically selected or switched to the characteristic variable antenna in accordance with the sampling period of the ADC unit.

In the radio base station according to the first invention, the characteristic variable antenna includes a plurality of antenna elements having the antenna characteristics that are different from each other and a switch configured to select one of the plurality of antenna elements in accordance with the predetermined variable timing.

In the radio base station according to the first invention, the characteristic variable antenna includes a plurality of antenna elements having the antenna characteristics that are different from each other and a combination unit configured to combine outputs of the plurality of antenna elements in a different combination in accordance with the predetermined variable timing and switch the antenna characteristics.

In the radio base station according to the first invention, the characteristic variable antenna includes one feed antenna element and a movable unit configured to switch the antenna characteristics by moving, vibrating, or rotating the feed antenna element at a speed according to the predetermined variable timing.

In the radio base station according to the first invention, the characteristic variable antenna includes a fixed feed antenna element, at least one parasitic antenna element or reflecting plate, and a movable unit configured to switch the antenna characteristics by moving, vibrating, or rotating the parasitic antenna element or the reflecting plate at a speed according to the predetermined variable timing.

According to a second invention, radio base station a reception method at radio base station for receiving an uplink multi-user MIMO signal according to OFDM modulation includes receiving the uplink multi-user MIMO signal by a characteristic variable antenna capable of selecting or switching antenna characteristics in accordance with a predetermined periodic variable timing, performing a reception process, by an RF unit, on a signal received by the characteristic variable antenna and outputting, by the RF unit, an analog signal on which the reception process has been performed, converting, by an ADC unit, the analog signal input from the RF unit into a digital signal by sampling the analog signal at a sampling period corresponding to the variable timing of the antenna characteristics of the characteristic variable antenna and outputting the digital signal by the ADC unit, dividing, by a signal dividing unit, the digital signal input from the ADC unit into different digital signals in accordance with the antenna characteristics and outputting divided different digital signals by the signal dividing unit, receiving, by a MIMO-OFDM demodulation unit, inputs of the different digital signals divided by the signal dividing unit and performing a demodulation process of predetermined MIMO-OFDM by the MIMO-OFDM demodulation unit, and giving, by a control unit, the predetermined variable timing at which the antenna characteristics of the characteristic variable antenna are periodically selected or switched to the characteristic variable antenna in accordance with the sampling period of the ADC unit.

Effects of the Invention

According to the present invention, in an environment in which a radio base station using OFDM modulation receives signals from a plurality of wireless terminal stations using MIMO, the radio base station periodically changes antenna characteristics in synchronization with a reception sampling period, divides data acquired by the antenna in accordance with antenna characteristics, and receives the received signals as different signals using MIMO-OFDM, and therefore costs and power consumption can be reduced by sharing the RF unit and the ADC.

BRIEF DESCRIPTION OF DRAWINGS

FIG. 5 is a diagram illustrating a configuration example of a radio base station of the related art.

DESCRIPTION OF EMBODIMENTS

Figure 1:
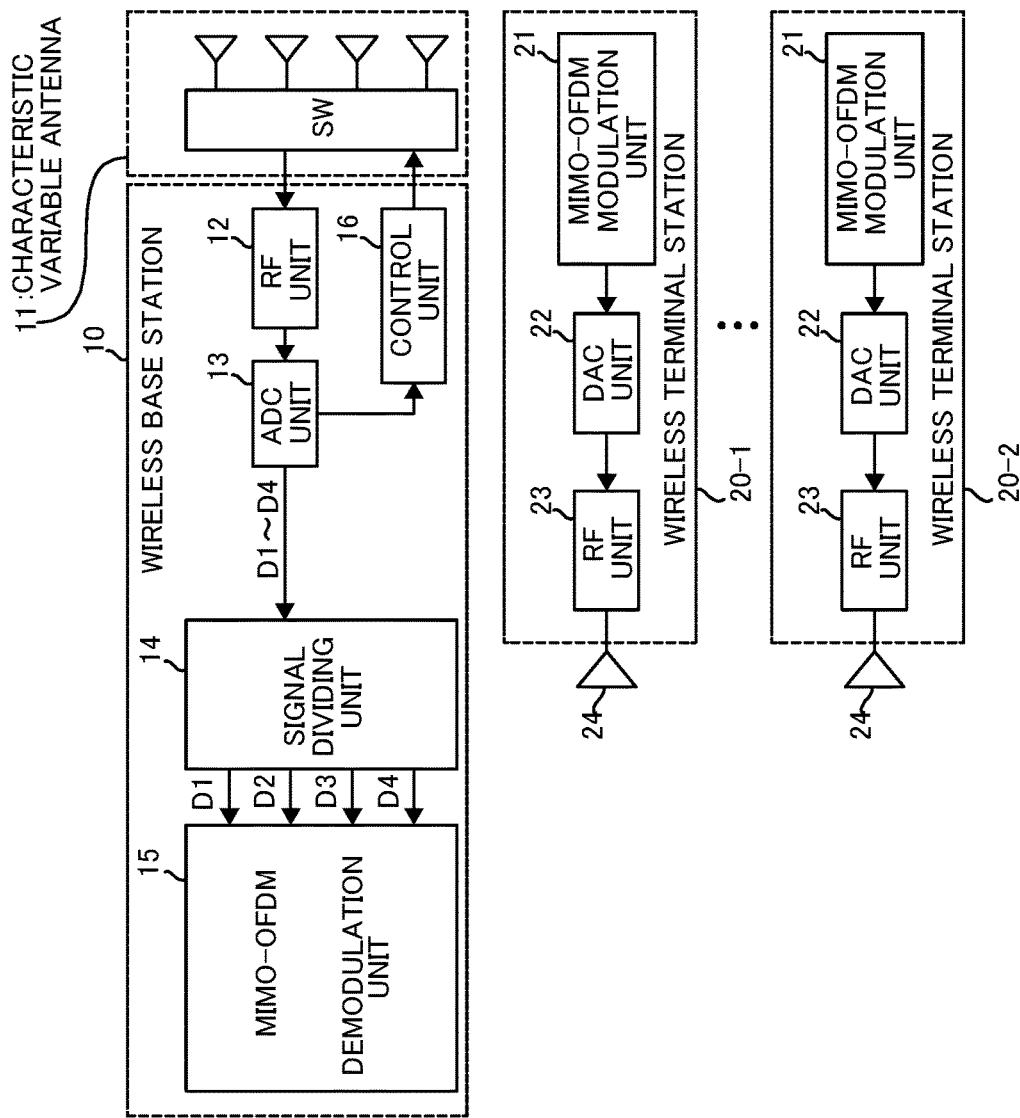
FIG. 1 is a diagram illustrating a configuration example of a radio base station and a wireless terminal station according to the present invention.

FIG. 1 is a diagram illustrating a configuration example of a radio base station and a wireless terminal station according to the present invention. In FIG. 1, two or more wireless terminal stations 20-1 and 20-2 are present in a service zone that is a range in which radio communication with the wireless base station 10 is available.

The wireless base station 10 includes a characteristic variable antenna 11, an RF unit 12, an ADC unit 13, a signal dividing unit 14, a MIMO-OFDM demodulation unit 15, and a control unit 16. Here, functional blocks that are generally mounted in a base station are omitted.

The characteristic variable antenna 11 is an antenna that periodically switches antenna characteristics (directivity, an output, a phase, and the like) in accordance with a control signal input from the control unit 16. For example, the characteristic variable antenna 11 corresponds to a component that periodically performs switching, by using a single switch SW, to one of antennas 51-1 to 51-4 of the related art illustrated in FIG. 5. Other examples of the characteristic variable antenna 11 will be described below. A signal received by this characteristic variable antenna 11 is output to one RF unit 12.

The RF unit 12 performs processing such as amplification, frequency changing, filtering, and the like on a signal input from the characteristic variable antenna 11 and outputs the processed signal to the ADC unit 13. In other words, the RF unit 12 has the function of an RF front end of a general radio device. The ADC unit 13 converts an analog signal input from the RF unit 12 into a digital signal and outputs the converted digital signal to the signal dividing unit 14. In addition, the ADC unit 13 notifies the control unit 16 of a sampling period of the ADC unit. The signal dividing unit 14 divides a signal input from the ADC unit 13 in synchronization with the sampling period and outputs divided signals to the MIMO-OFDM demodulation unit 15. The MIMO-OFDM demodulation unit 15 performs a demodulation process of the MIMO-OFDM defined in a wireless LAN system or the like on the signals divided by the signal dividing unit 14.

Here, in a case where the characteristic variable antenna 11 periodically performs switching of antenna characteristics, for example, by periodically selecting one of four antennas, the ADC unit 13 outputs signals D1 to D4 corresponding to respective antenna characteristics in a time divisional manner at a period that is four times the sampling period of the ADC unit 53 of the related art illustrated in FIG. 5. The control unit 16 performs switching of the antenna characteristics by selecting one of the four antennas at the sampling period of the ADC unit 13. In addition, the signal dividing unit 14 divides the signals D1 to D4 corresponding to respective antenna characteristics at this sampling period and outputs divided signals to the MIMO-OFDM demodulation unit 15. As a result, different signals D1 to D4 are periodically output to different output ports among four output ports of the signal dividing unit 14 in accordance with antenna characteristics.

In addition, signals may be sampled more finely through oversampling by the ADC unit 13, and a signal of a short period may be generated by combining such signals.

The switch SW of the characteristic variable antenna 11 may simultaneously select a plurality of antennas and output a combined signal to the RF unit 12.

Each of the wireless terminal stations 20-1 and 20-2 includes a MIMO-OFDM modulation unit 21, a DAC unit 22, an RF unit 23, and an antenna 24 and is similar to a configuration of the related art. Here, functional blocks that are generally mounted in a terminal station are omitted.

The MIMO-OFDM modulation unit 21 performs a modulation process of the MIMO-OFDM defined in a wireless LAN system or the like and outputs a modulated signal to the DAC unit 22. The DAC unit 22 converts a digital signal input from the MIMO-OFDM unit 21 into an analog signal and outputs the analog signal to the RF unit 23. The RF unit 23 performs processing such as amplification, frequency changing, filtering, and the like on the signal input from the DAC unit 22 and outputs a processed signal to the antenna 24. In other words, the RF unit 23 has the function of an RF front end of a general radio device. The antenna 24 emits a signal that is input from the RF unit 23 into the air.

Figure 2:
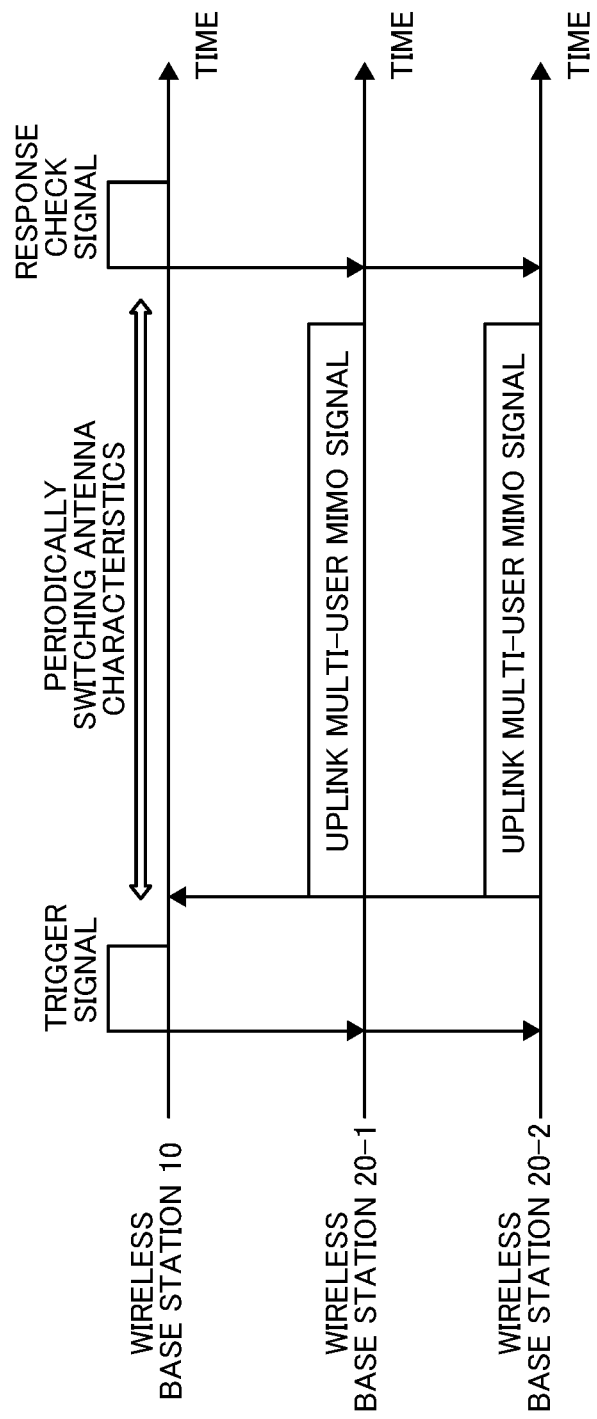
FIG. 2 is a diagram illustrating an example of a sequence of multi-user MIMO transmission in an uplink according to the present invention.

FIG. 2 is a diagram illustrating an example of a sequence of multi-user MIMO transmission in an uplink according to the present invention.

In FIG. 2, in order to perform uplink multi-user MIMO transmission, the wireless base station 10 transmits a trigger signal to the wireless terminal stations 20-1 and 20-2. The trigger signal is a signal used for synchronizing transmission timings, transmission power, frequencies, and the like between wireless terminal stations and is a frame defined in the IEEE 802.11ax wireless LAN standard. In addition, the trigger signal is transmitted in accordance with predetermined antenna characteristic of the characteristic variable antenna 11 of the wireless base station 10, and the antenna characteristics are assumed not to be changed during transmission of the trigger signal.

Next, each of the wireless terminal stations 20-1 and 20-2 that have received the trigger signal generates an OFDM signal for uplink multi-user MIMO transmission in accordance with the trigger signal under synchronization of various parameters and transmits the generated OFDM signal to the wireless base station 10. On the other hand, by employing the configuration illustrated in FIG. 1, the wireless base station 10 receives an OFDM signal of the uplink multi-user MIMO transmission while periodically performing switching of antenna characteristics of the characteristic variable antenna 11. The wireless base station 10 checks whether the received signal is free of errors and transmits a result thereof to the wireless terminal stations 20-1 and 20-2 with predetermined antenna characteristics using a response check signal.

The trigger signal and the response check signal may be transmitted by selecting and fixing one of the four antennas of the characteristic variable antenna 11 or may be transmitted using a dedicated antenna having predetermined antenna characteristics.

Figure 3:
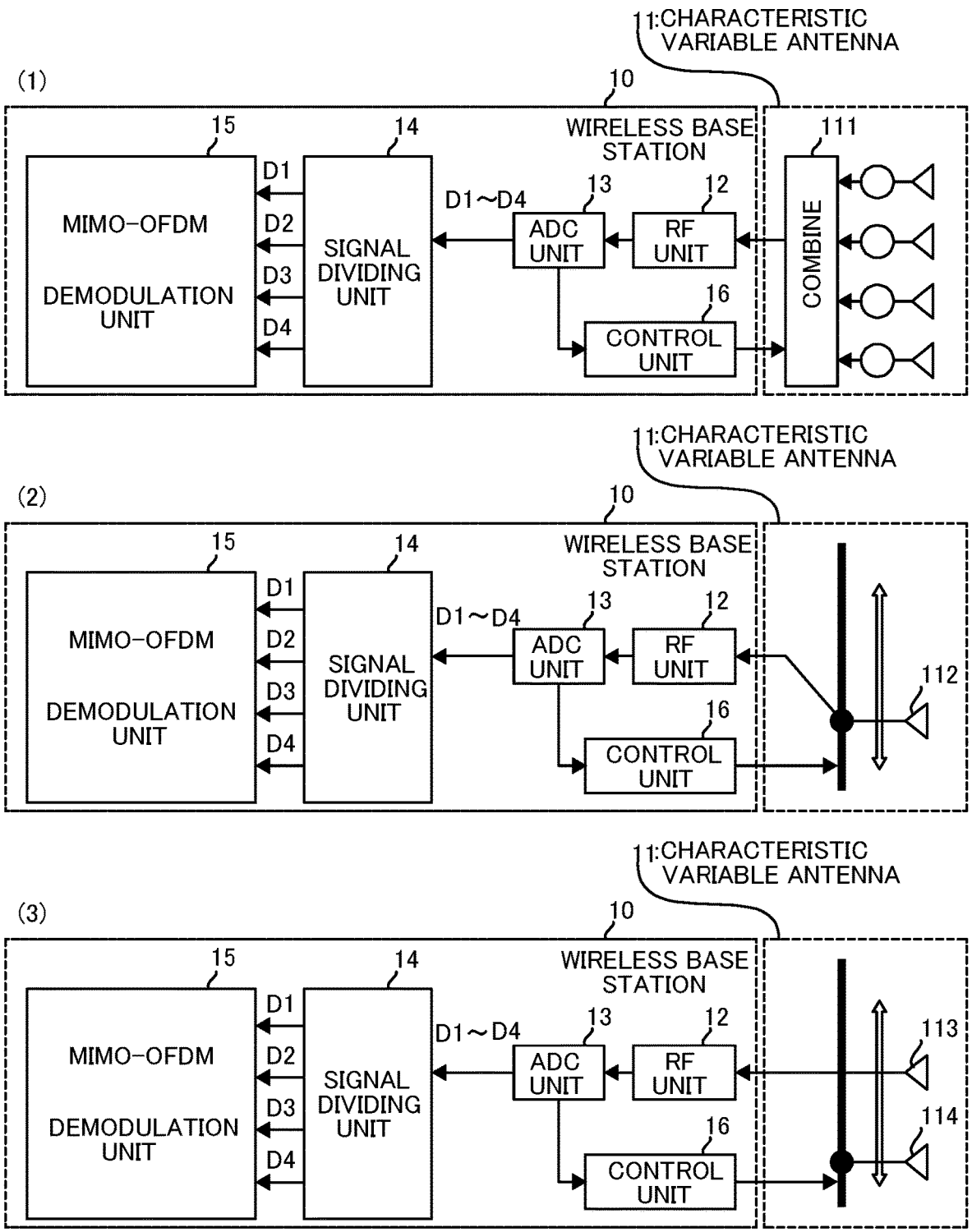
FIG. 3 is a diagram illustrating another configuration example of a characteristic variable antenna 11.

FIG. 3 illustrates another configuration example of the characteristic variable antenna 11. The characteristic variable antenna 11 illustrated in FIG. 3(1) has a configuration in which signals received by a plurality of antennas are combined by a combination unit 111 and output to the RF unit 12. The antenna characteristics are switched in accordance with a combination of antennas to be combined. For example, in the case of four antennas, six kinds of antenna characteristics can be acquired as a combination of two antennas, and thus a total of 10 kinds of antenna characteristics including antenna characteristics of one antenna can be acquired. This can be handled by configuring the sampling period of the ADC unit 13 to be 10 times that of a case of the related art. Furthermore, a configuration in which the weight is multiplied using a phase shifter or an attenuator in each antenna may be employed.

The characteristic variable antenna 11 illustrated in FIG. 3(2) has a configuration in which antenna characteristics can be changed by moving (vibrating) or rotating one feed antenna element 112 at a high speed under the control of the control unit 16. The movement (vibration) of the feed antenna element 112 can be performed by employing a configuration of rotating the feed antenna element 112 on a circular rail or a configuration of reciprocating the feed antenna element 112 on a linear rail. The rotation of the feed antenna element 112 can be performed using a rotary joint.

The characteristic variable antenna 11 illustrated in FIG. 3(3) has a configuration in which one or a plurality of parasitic antenna elements 114 are disposed in the vicinity of a fixed feed antenna element 113, and antenna characteristics are changed by moving (vibrating) or rotating the parasitic antenna elements 114 at a high speed under the control of the control unit 16. The method of moving (vibrating) or rotating the parasitic antenna elements 114 is similar to that of the case illustrated in FIG. 3(2). In addition, a reflecting plate may be used in place of the parasitic antenna elements 114. Furthermore, in order to change the antenna characteristics, the reflecting plate may be composed of a complicated surface. In addition, a configuration in which the antenna characteristics are changed by changing a capacitor connected to the parasitic antenna elements 114 may be employed.

Figure 4:
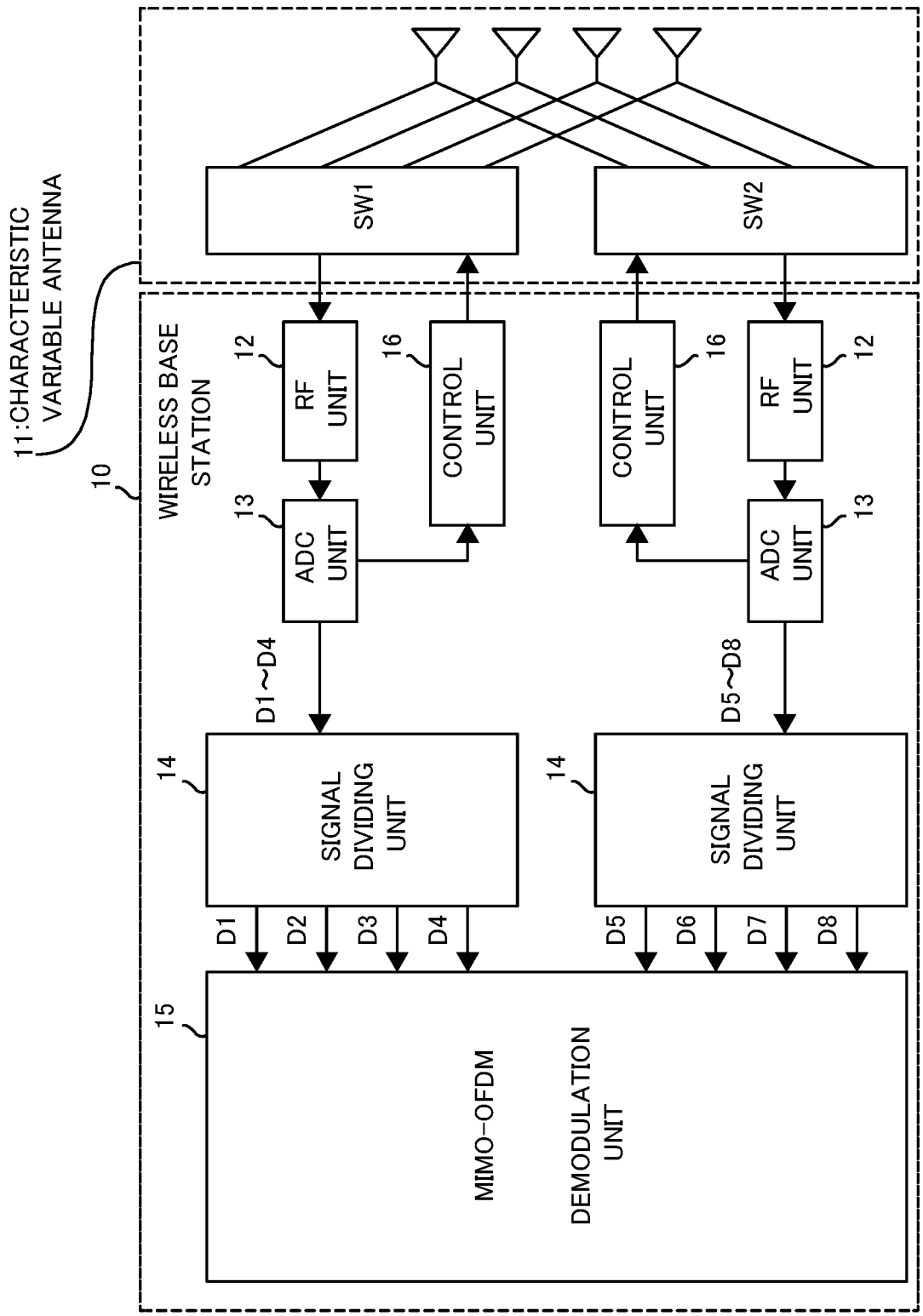
FIG. 4 is a diagram illustrating another configuration example of a radio base station according to the present invention.

FIG. 4 is a diagram illustrating another configuration example of the radio base station according to the present invention. FIG. 4 illustrates a configuration in which the characteristic variable antenna 11 illustrated in FIG. 1 and two sets of the RF unit 12, the ADC unit 13, and the signal dividing unit 14 of the wireless base station 10 are provided, and outputs of the signal dividing units 14 are input to the MIMO-OFDM demodulation unit 15. Here, antennas of the two sets of the characteristic variable antennas 11 are common, and the control units 16 perform control such that antennas selected by the switches SW1 and SW2 are different from each other.

In addition, the characteristic variable antenna 11 using the combination unit 111 illustrated in FIG. 3 (1) can be similarly configured, and combinations of the antennas to be combined are controlled to be different from each other.

REFERENCE SIGNS LIST

10 Wireless base station
11 Characteristic variable antenna
12 RF unit
13 ADC unit
14 Signal dividing unit
15 MIMO-OFDM demodulation unit
16 Control unit
20 Wireless terminal station
21 MIMO-OFDM modulation unit
22 DAC unit
23 RF unit
24 Antenna
111 Combination unit
112, 113 Feed antenna element
114 Parasitic antenna element

The invention claimed is:

1. A radio base station that receives an uplink multi-user MIMO signal according to OFDM modulation, the radio base station comprising:
    a characteristic variable antenna configured to periodically switch antenna characteristics, wherein the timing at which the antenna characteristics switch is triggered by a timing signal and the characteristic variable antenna includes only one antenna element;
    an RF unit configured to perform a reception process on a signal received by the characteristic variable antenna and output an analog signal on which the reception process has been performed;
    an ADC unit configured to convert the analog signal input from the RF unit into a digital signal by sampling the analog signal at a sampling period and output the digital signal;
    a signal dividing circuit configured to divide the digital signal input from the ADC unit into different digital signals in accordance with the antenna characteristics and output the divided different digital signals;
    a MIMO-OFDM demodulation unit configured to receive inputs of the different digital signals divided by the signal dividing circuit and perform a demodulation process of predetermined MIMO-OFDM; and
    a control circuit interfaces with the ADC unit and is configured to generate the timing signal based on the sampling period from the ADC unit.

2. The radio base station according to claim 1, further includes a movable unit configured to switch the antenna characteristics by moving, vibrating, or rotating the antenna element at a speed according to the timing signal.

3. A reception method at radio base station for receiving an uplink multi-user MIMO signal according to OFDM modulation, the reception method at radio base station comprising:
    receiving the uplink multi-user MIMO signal by a characteristic variable antenna capable of switching antenna characteristics;
    performing a reception process, by an RF unit, on a signal received by the characteristic variable antenna and outputting, by the RF unit, an analog signal on which the reception process has been performed;
    converting, by an ADC unit, the analog signal input from the RF unit into a digital signal by sampling the analog signal at a sampling period;
    dividing, by a signal dividing circuit, the digital signal input from the ADC unit into different digital signals in accordance with the antenna characteristics and outputting divided different digital signals by the signal dividing unit;
    receiving, by a MIMO-OFDM demodulation unit, inputs of the divided different digital signals from the signal dividing circuit and performing a demodulation process of predetermined MIMO-OFDM by the MIMO-OFDM demodulation unit;
    generating, by a control circuit, a timing signal based on the sampling period of the ADC unit; and
    periodically switching antenna characteristics of the characteristic variable antenna, wherein the timing at which the antenna characteristics switch is triggered by the timing signal and the characteristic variable antenna includes only one antenna element.

* * * * *